United States Patent [19]

Gillen

[11] Patent Number: 5,673,896
[45] Date of Patent: Oct. 7, 1997

[54] REDUCED LENGTH BOLTED BALL VALVE

[75] Inventor: Mark E. Gillen, Crawfordsville, Ind.

[73] Assignee: Banjo Corporation, Crawfordsville, Ind.

[21] Appl. No.: 531,010

[22] Filed: Sep. 20, 1995

Related U.S. Application Data

[63] Continuation-in-part of Ser. No. 320,177, Oct. 7, 1994, abandoned.

[51] Int. Cl.⁶ ........................................... F16K 5/06
[52] U.S. Cl. ........................ 251/315.14; 251/148
[58] Field of Search ................... 251/315.14, 148, 251/152, 315.13

[56] References Cited

U.S. PATENT DOCUMENTS

| 3,462,120 | 8/1969 | Priese | 251/315 |
| 4,099,705 | 7/1978 | Runyan | 251/315.14 X |
| 4,177,832 | 12/1979 | Price | 137/625 |
| 4,527,771 | 7/1985 | Yeary | 251/305 X |
| 4,557,461 | 12/1985 | Gomi et al. | 251/172 |

FOREIGN PATENT DOCUMENTS

| 2807913 | 8/1979 | Germany | 251/315.14 |
| 497136 | 9/1955 | Italy | 251/315.14 |

OTHER PUBLICATIONS

Banjo Liquid Handling Products brochure, Terra–Products, Inc., Oct. 1993.
Valve Assembly, photographs marked as Fig. 1 and Fig. 2.
Valve Assembly, photographs marked as Fig. 3 and Fig. 4.
Valve Assembly, photographs marked as Fig. 5 and Fig. 6.
Valve Assembly, photographs marked as Fig. 7 and Fig. 8.

*Primary Examiner*—John Fox
*Attorney, Agent, or Firm*—Baker & Daniels

[57] ABSTRACT

A reduced length bolted ball valve assembly used to control the flow of liquid between components of a liquid handling system. The valve assembly includes an abutting pair of end bodies, connectable to the liquid handling system components, which are attached by bolts passing through flanges provided at the inward ends of the end bodies. One end body, which is provided with a liquid system connector that both outwardly projects from the attachment flange and is used to connect to the liquid handling system component, includes an interior cavity outward of its attachment flange. Housed within this interior cavity is a rotatable ball valve element with a diametric bore. A handle is engaged with the rotatable ball valve element via a member which extends through an end body bore, which opens into the interior cavity and which is located outward of the attachment flange. The handle allows the valve element to be rotated to effect opening and closing of flow communication between liquid conveying bores provided within the end bodies.

15 Claims, 4 Drawing Sheets

REDUCED LENGTH BOLTED BALL VALVE

BACKGROUND OF THE INVENTION

This application is a continuation-in-part of application Ser. No. 08/320,177, filed Oct. 7, 1994 now abandoned.

The present invention pertains to liquid handling products, and, in particular, to a valve utilized to regulate the flow of liquid materials.

A wide assortment of valve assemblies are known which enable control of the flow of liquid within liquid handling systems. The liquid handling systems with which these valve assemblies are employed are also varied. One type of liquid handling system involves portable tanks known as Intermediate Bulk Containers (IBCs), which are used to transport liquids, frequently of a corrosive or dangerous nature, between destinations. A port of each of these IBCs is typically connected with a valve assembly that controls the flow of fluid in to or out from the tank. Each of these valve assemblies is also typically provided with a type of liquid system connector which is quickly and easily connectable with a complementary shaped fitting or connector provided for a hose or conduit, thereby facilitating the hook up of the portable tank to another portion of the liquid handling system.

One problem associated with using a valve assembly with an IBC, as well as with other liquid handling system devices, is that the space frequently allotted for valve assembly installation is of a relatively small size and may be tucked away at a difficult to access location. Many existing, commercially available valve assemblies, such as standard bolted ball valves, that provide a liquid conduit large enough to adequately service the tank do not fit within the allotted space.

Many of the smaller dimensioned valve assemblies which have been constructed for use with IBCs are custom designed by a manufacturer to fit a particular IBC made by that manufacturer. These assemblies utilize a one-piece, molded plastic body with an internally disposed valve closure element, such as a rotatable ball or cylinder or a longitudinally movable plunger. The body includes liquid system connectors at either end which can be attached, sometimes with the use of an additional collar, to particularly shaped components of the liquid handling system, such as the IBC port or a hose. One problem with these valve assemblies is that because they are custom formed for a particular IBC, they are not adaptable for use with differently configured IBCs or system components. Therefore, in order for these valve assemblies to be used with some other IBCs, either a different body entirely would be required to be molded, or an additional adaptor component must be provided and added on to the unit, which may undesirably increase the valve assembly length.

Thus, it is desirable to provide a valve assembly which has a reduced length from inlet to outlet to allow advantageous utilization in shorter dimensioned spaces. It is also desirable to provide a valve assembly which can be adapted to fit a particular liquid handling system component without requiring that substantially the entire valve assembly be redesigned or replaced.

SUMMARY OF THE INVENTION

The present invention provides a bolted ball valve assembly with a reduced length from inlet to outlet, thereby allowing for its use in spaces which previously were too small for use with conventional bolted ball valve assemblies. The inventive valve assembly provides the interior cavity in which the ball valve is housed in an end body of the assembly, instead of within a central body which is flanked by a pair of end bodies as with conventional bolted ball valve assemblies.

In one form thereof, the present invention provides a valve assembly for controlling a flow of liquid between first and second components of a liquid handling system. The valve assembly includes a rotatable valve element and a first end body connectable to the first liquid handling system component. The valve assembly also includes a second end body which includes an attachment flange having an inward surface facing in a first direction toward the first end body, a liquid system connector connectable to the second liquid handling system component, an interior cavity located outwardly in a second direction from the attachment flange inward surface, wherein the interior cavity is structured and arranged to house at least a majority portion of the rotatable valve element, and a liquid conveying bore in communication with the interior cavity. The valve assembly also includes means, engagable with the attachment flange, for fastening the second end body to the first end body, as well as means, operably connected to the rotatable valve element, for rotating the valve element between a first position, whereat flow communication between the first end body liquid conveying bore and the second end body liquid conveying bore is closed, and a second position, whereat flow communication between the first end body liquid conveying bore and the second end body liquid conveying bore is open. The rotatable valve element within the interior cavity outwardly extends into an internal volume of the liquid system connector whereby a portion of the rotatable valve element resides within an internal volume of the second liquid handling system component when the liquid system connector is connected to the second liquid handling system component.

In another form thereof, the present invention provides a valve assembly for controlling a flow of liquid between first and second components of a liquid handling system. The valve assembly a first end body and a second end body. The first end body includes an attachment flange, a bore for conveying liquid, and means for connecting to the first liquid handling system component. The second end body includes an attachment flange having an inward surface facing in a first direction toward the first end body, a liquid system connector connectable to the second liquid handling system component and projecting outwardly from the attachment flange, a first bore within the liquid system connector for conveying liquid, an interior cavity outwardly extending in a second direction from the attachment flange inward surface, wherein the interior cavity is in communication with the first bore, and a second bore in communication with the interior cavity and located outwardly in the second direction from the attachment flange inward surface. The valve assembly also includes a plurality of fastener means for engaging the first and second end body attachment flanges and mechanically fastening together the first end body and the second end body. The valve assembly also includes a valve element housed within the second end body interior cavity, wherein the valve element is rotatable between a first position, whereat flow communication between the first end body liquid conveying bore and the second end body first bore is closed, and a second position, whereat flow communication between the first end body liquid conveying bore and the second end body first bore is open. The valve assembly also includes a handle as well as means, extending through the second end body second bore, for connecting the handle and the rotatable valve element, whereby rotation of the handle effects rotation of the valve element. The rotatable valve element within the interior cavity outwardly extends into an internal volume of the liquid system connector whereby a portion of the rotatable valve element resides within an internal volume of the second liquid handling system component when the liquid system connector is connected to the second liquid handling system component.

An advantage of the present invention is that its reduced length allows for its use within spaces previously too small for conventionally configured bolted ball valve assemblies.

Another advantage of the present invention is that it is adaptable for use with differently configured ports of IBCs or other liquid handling system components by replacement of a single end body.

Another advantage of the present invention is that the reduction in parts needed to form the exterior body of the valve assembly facilitates the process of its assembly.

Still another advantage of the present invention is that it provides a durable, heavy-duty valve assembly resistant to leakage of liquid therethrough.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Figure 1:
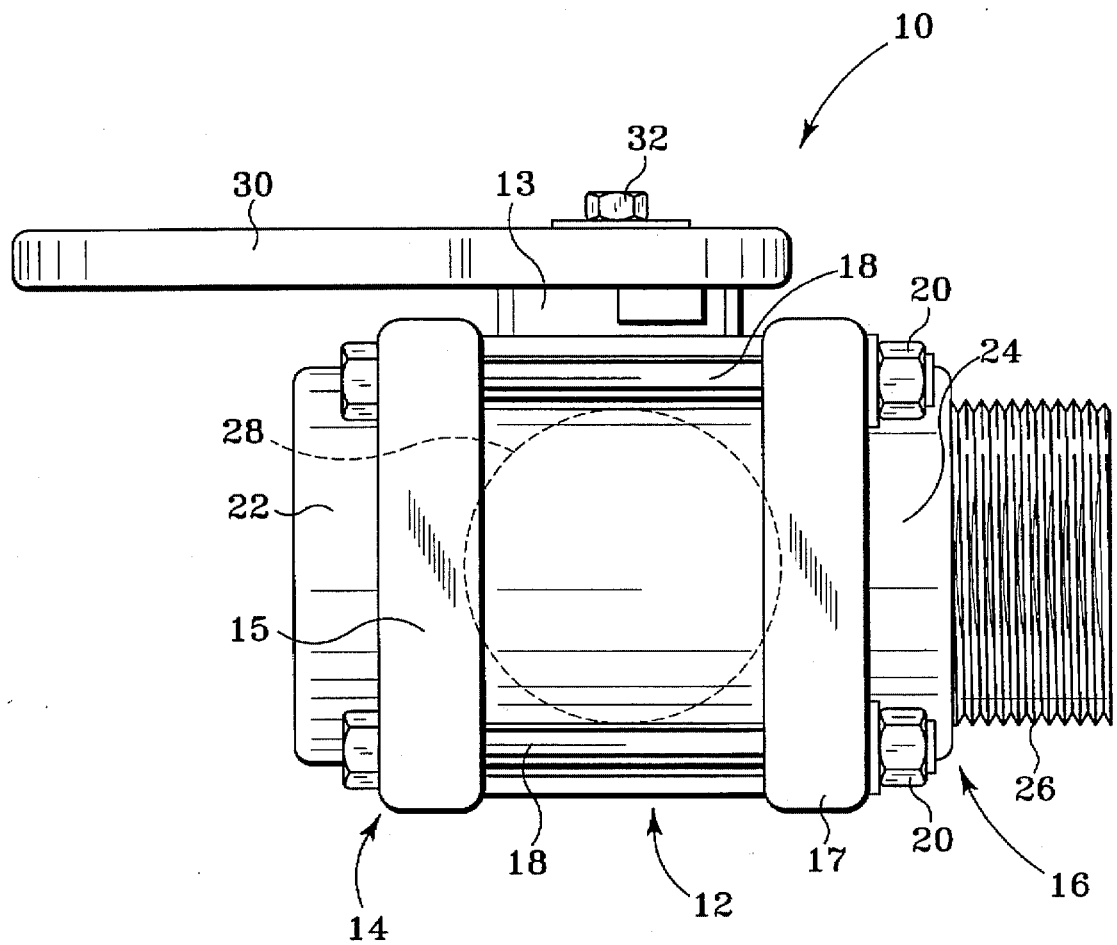
FIG. 1 is a front elevational view of a prior art bolted ball valve assembly.

Corresponding reference characters indicate corresponding parts throughout the several views. Although the drawings represent an embodiment of the invention, the drawings are not necessarily to scale and certain features may be exaggerated in order to better illustrate and explain the present invention.

DESCRIPTION OF THE PREFERRED EMBODIMENT

The embodiment disclosed below is not intended to be exhaustive or limit the invention to the precise form disclosed in the following detailed description. Rather, the embodiment is chosen and described so that others skilled in the art may utilize its teachings.

Referring now to FIG. 1, there is shown a front elevational view of one configuration of a conventional bolted ball valve assembly which is known in the art. The bolted ball valve assembly is generally designated 10 and includes a central body 12 which is flanked by a pair of end bodies 14, 16. While only two bolts are shown in FIG. 1, four bolts 18 passing through holes provided at the corners of square attachment flanges 15, 17 of end bodies 14, 16 engage nuts 20 to tighten end bodies 14, 16 against central body 12. Suitable gaskets ensure a fluid tight connection between end bodies 14, 16 and central body 12.

Longitudinally projecting from the outwardly facing surfaces of attachment flanges 15, 17 of end bodies 14, 16 are those components used to interconnect valve assembly 10 to liquid handling system components such as a hose or a port of a tank. End body 14 is shown being formed with annular sleeve 22. A linkage mechanism within sleeve 22, for example internal or female screw threads therein, permit connection with a complementary linkage mechanism, such as a male threaded end, of any of a variety of well known liquid system connectors or fittings utilized in the liquid handling system field. Representative liquid system connectors include male adapters and complementarily shaped female couplers used in cam lever couplings, hose barbs, and tank flanges. End body 14 can thereby be equipped with interchangeable and desired liquid system connectors by screwing on the liquid system connector without disassembling end body 14 from central body 12.

End body 16 is shown with liquid system connector 26, namely a threaded male adapter having a liquid conveying axial bore, extending from sleeve 24 formed on attachment flange 17. The external threading of liquid system connector 26, as well as the internal threading of annular sleeve 22, is configured according to the American National Standard Taper Pipe Thread convention, but other threadings may also be employed. Liquid system connector 26 and end body annular sleeve 24 can be integrally formed to eliminate the need to manually interconnect them for use.

Rotatably mounted within central body 12 is a spherical ball, shown in shadow at 28, used to control the flow of liquid through valve assembly 10. Ball 28 includes a diametrical bore (not shown) which may be rotatably aligned with ports provided in end bodies 14, 16 to provide liquid communication therebetween. Handle 30 operatively engages ball 28 via a keyed stem which passes through an opening in the upstanding neck 13 of central body 12, and handle 30 is secured to the stem by handle bolt 32. Handle 30 allows for the manual operation of ball 28 externally of body 12.

Figure 2:
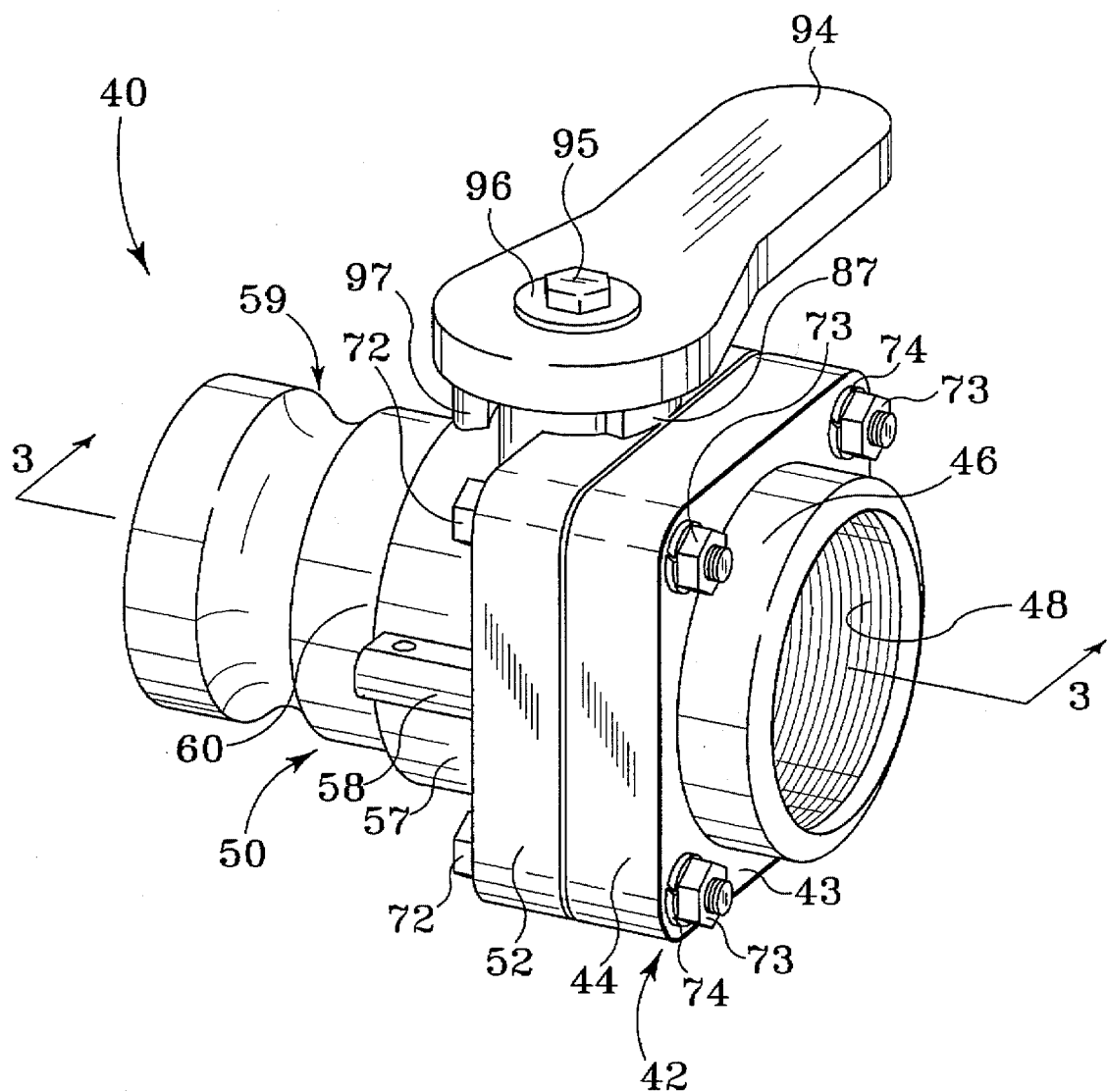
FIG. 2 is a front perspective view of an embodiment of a bolted ball valve assembly of the present invention.
Figure 3:
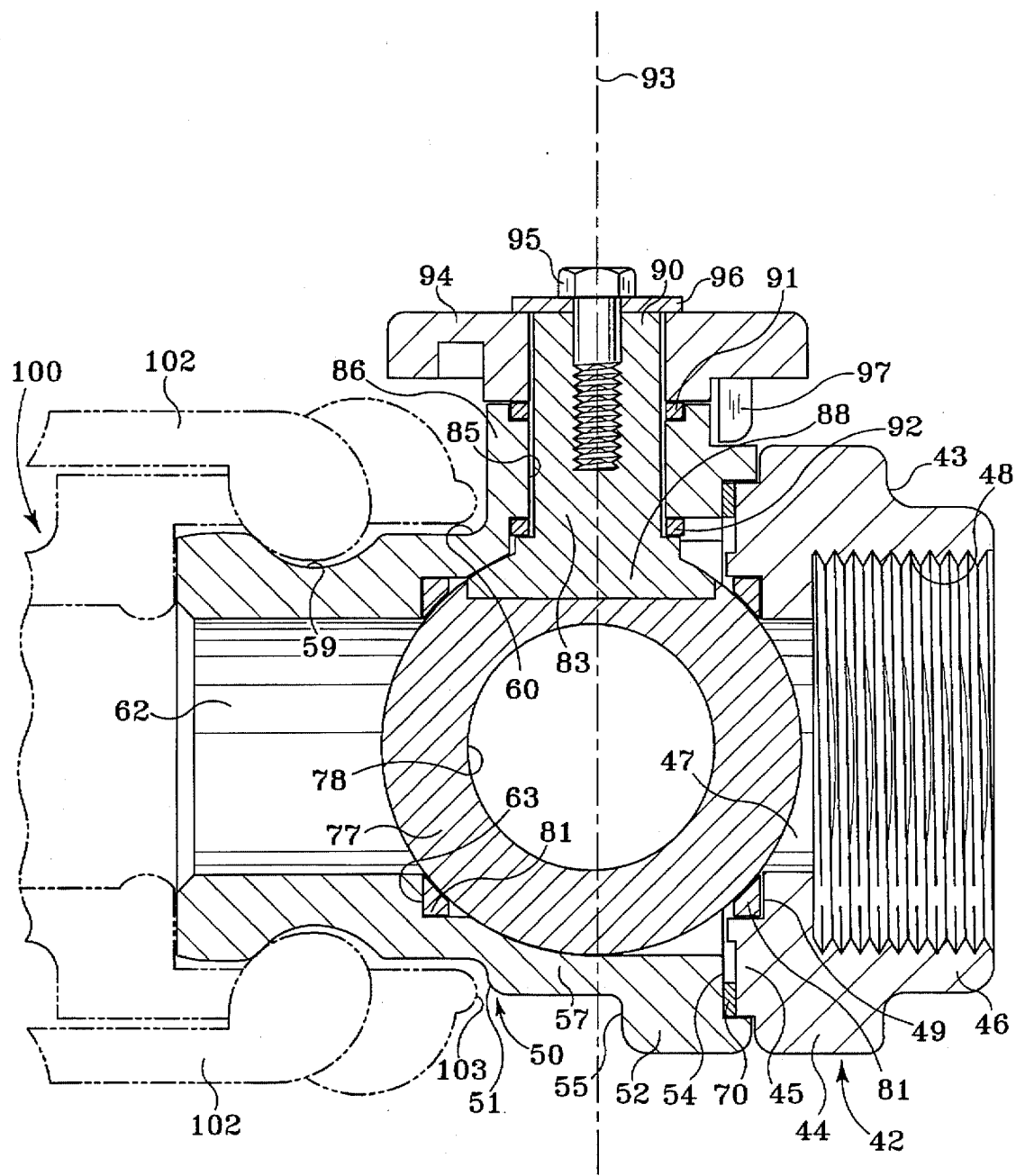
FIG. 3 is a cross-sectional front view taken along line 3—3 of the bolted ball valve assembly of the present invention, wherein portions of a mating liquid handling system component are shown in dashed lines.
Figure 4:
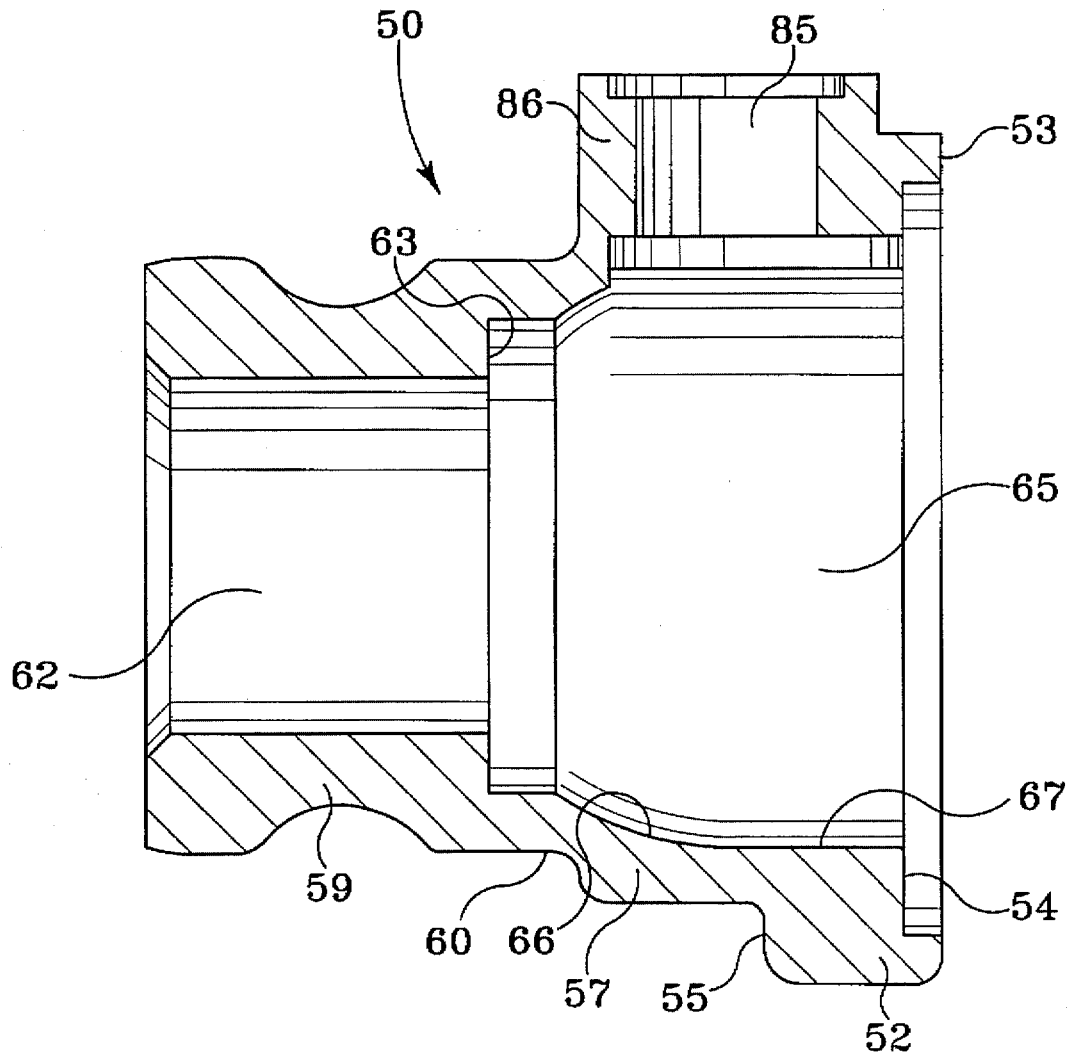
FIG. 4 is a cross-sectional front view of the left end body of the bolted ball valve assembly of FIG. 2 removed from the remainder of the valve assembly.

With the foregoing as background, the structure of the valve assembly of the present invention will be explained with reference to FIGS. 2–4. The inventive valve assembly, generally designated 40, is shown as a bolted ball valve assembly. Valve assembly 40 can be interposed between two components of a liquid handling system, for example between a tank and a hose, to control the flow of liquid therebetween. Valve assembly 40 includes a pair of end bodies, generally designated 42 and 50, assembled in an abutting, stacked arrangement. At their longitudinally inward ends that face each other when the valve assembly is finally assembled, end bodies 42, 50 include attachment flanges 44, 52 respectively. While shown as plate shaped including a square periphery and a generally uniform thickness, attachment flanges 44, 52 may be alternately configured, such as with a hexagonal shape, within the scope of the present invention. A gasket 70, formed of a sealing material such as VITON®, is pressed between an annular shoulder 54 recessed from the inward surface of attachment flange 52 and a ring-shaped projection 45 extending from the inward surface of attachment flange 44. Gasket 70 better ensures a fluid tight seal between end bodies 42, 50.

Four bolts 72 made of stainless steel serve to fasten end bodies 42, 50 together. Each bolt 72 inserts through aligned holes provided in attachment flanges 44, 52 at one of the four corners of the flanges. Stainless steel nuts 73 with lockwashers 74 are fastened to each of the threaded shanks of bolts 72 and are tightened down against the longitudinally outward, planar surface 55 of end body flange 52 to obtain a secure connection of end bodies 42, 50. Other types of mechanisms for fastening together end bodies 42, 50, for example mechanical fasteners such as screws that fit threaded bores in an end body or flange, may alternatively be used instead of bolts 72 and nuts 73. However, the bolt and nut fasteners shown are employed for their high strength and ease of assembly.

In the shown embodiment, end body 42 includes an annular sleeve 46 which is integrally formed with attachment flange 44 and longitudinally projects from outward surface 43 of attachment flange 44. A longitudinally aligned bore 47 in end body 42 serves as a port through which liquid flows in to or out from the rotatable valve element or ball 77. To facilitate further explanation, bore 47 will subsequently be considered the inlet port for valve assembly 40. Female threads 48 around inlet bore 47 and formed into the interior surface of sleeve 46 and attachment flange 44 permit threaded engagement with the male threads of a complementarily shaped component, such as the port of an IBC. Threads 48 are configured according to the American National Standard Taper Pipe Thread convention. Alternately shaped or configured threads can also be utilized within the scope of the invention. As a result of this threaded engagement, a liquid conveying connection between valve assembly 40, and in particular end body 42, and a liquid handling system component, such as a hose or outlet port of a liquid source, may be achieved. It will be appreciated that this configuration of end body 42 is merely illustrative, however, as the overall shape and function of end body 42, other than its general ability to be connected to another component in the liquid handling system, is immaterial to the present invention. For example, end body 42 could be integrally formed with a liquid system connector as described above with respect to the prior art, as well as could connect to a liquid handling system component in a manner other than a threaded engagement.

End body 50 is integrally formed with an annular body section 57 and an adjacent liquid system connector 59 projecting outwardly from attachment flange 52. In the shown embodiment, liquid system connector 59 is a male adapter which has an exterior shaped to be insertable into a female coupler of a cam-locking type, quick disconnect coupling assembly conforming to military standards approved for use by agencies of the Department of Defense, such as MS 27019 which is incorporated herein by reference. The female coupler, which is partially and abstractly shown in dashed lines in FIG. 3, is generally indicated at 100 and is shown with its pivotable cam levers or arms 102 in a camming arrangement to connect coupler 100 to male adapter 59. When the coupler and adapter are connected, the outward end 103 of the female coupler is closely spaced to the inward end of the male adapter which is defined by flange face 51. In the shown embodiment, the ball valve projects a distance about equal to 25% of its diameter into the interior of the male adapter, that is to the left in FIG. 3. This distance is about 33% of the male adapter's length. When the coupler is connected to the adapter as shown in FIG. 3, the ball valve projects into the internal volume of the coupler, that is to the left of coupler end 103 in FIG. 3. For the shown arrangement, the ball valve projects into the interior volume of the coupler a distance about equal to 20% of that axial length of the cylindrical hollow interior of the coupler that is designed to receive the male adapter. Greater or lesser amounts of valve projection, for example within the range of about 10% to 20% of that length of the female coupler designed to receive the male adapter, may also be provided within the scope of the invention.

While body section 57 may in alternate embodiments be merely an outward extension of attachment flange 52, i.e. part of a thicker attachment flange, body section 57 is annularly shaped with a periphery that only slightly extends beyond the radial periphery of liquid system connector inward end 60. This shaping allows clearance for the cam levers associated with the female coupler employed with male adapter 59. Though only one is shown in FIG. 2, a pair of apertured tabs 58 spaced 180° apart radially project from annular body section 57. The apertures in tabs 58 may be used to attach a lanyard connected to a cap for liquid system connector 59, or be used to attach a device used to lock handle 94 in a preselected position. A longitudinal, cylindrical bore 62 in liquid system connector 59 serves as an outlet port for valve assembly 40.

End bodies 42, 50 may be molded from fiberglass reinforced polypropylene to provide both high strength and durability. Alternate end body constructions, including stainless steel, are also within the scope of the invention.

Housed substantially within an interior cavity of end body 52 is the rotatable valve element 77 used to open and close valve assembly 40. In this embodiment, valve element 77 is a ball type element which is generally spherical in shape and made of a plastic material, such as polypropylene. As used herein, ball shaped is not restricted to exactly spherical in shape, but also includes those valve elements which overall are generally spherical but which may have various flattened surfaces. It will also be appreciated that alternatively shaped rotatable valve elements, such as cylindrical shaped structures, could also be employed. Ball 77 includes a diametrical cylindrical bore 78 having a diameter coextensive with cylindrical bore 62 and the portion of bore 47 passing through attachment flange 44. A pair of TEFLON® ring-shaped seals 81, each of which includes a beveled inner radial surface to conform to the shape of ball 77, are mounted on annular seats 49, 63 provided in end bodies 42, 50 respectively and facilitate rotation of ball 77.

The mechanism used to provide rotation of ball 77 includes stem 83, which upwardly extends from ball 77 through a bore 85 provided in both annular body section 57 and an upstanding end body neck 86. Keyed lower end 88 of stem 83 fits within a groove provided in ball 77 such that rotation of stem 83 is transferred to ball 77. In this embodiment, stem 83 is aligned along the axis of rotation, represented as line 93, about which ball 77 rotates during valve opening and closing. Upper end 90 of stem 83 is shaped to fit within a keyed hole in manually operable handle 94 to be rotationally fixed therewith. Screw 95, which is secured to an internally threaded metal plug (not shown) captive within stem upper end 90, cooperates with washer 96 to keep handle 94 secured to stem 83. Annular thrust bearing 91 is made of TEFLON® and facilitates rotation of stem 83. Annular gasket 92 is made of TEFLON® and seals stem 83 to ensure that liquid does not escape through bore 85. A pair of downwardly extending ears 97 of handle 94 cooperate with a stop tab 87 radially projecting from end body neck 86 (See FIG. 1) to limit the rotation of handle 94 between the transversely aligned position shown and a longitudinally aligned position. As is conventional, ball bore 78 is longitudinally oriented to allow liquid flow between the inlet and outlet ports when handle 94 is longitudinally aligned, and the valve is closed such that flow communication is halted when handle 94 is transversely aligned as shown in FIG. 3. The shown mechanism for connecting the ball valve to the handle, as well as the shown shape of the handle, are merely illustrative and not intended to limit the invention. Those of skill in the art will recognize that a variety of differently configured connection mechanisms and handles, such as the stem being mechanically fastened to the ball as well as many other configurations which are frequently utilized in the art, can be employed with the present invention.

The inventive configuration of end body 50 will now be further explained with reference to FIG. 4, wherein end body 50 is shown in a cross-sectional front view removed from the balance of valve assembly 40. End body interior cavity 65, in which rotatable valve element 77 is housed, outwardly extends from the inward surface 53 of attachment flange 52 toward bore 62 and is shaped complementary to the overall contour of ball 77. Bore 85 through which stem 83 extends opens into a central portion of interior cavity 65 to permit connection with ball 77. Along its longitudinal length, interior cavity 65 is generally circular in transverse cross-section. The end body interior surfaces which define interior cavity 65 include a concavely shaped region 66, which matches the curvature of ball 77. Generally cylindrical interior surface region 67 is so shaped to allow introduction of ball 77 during assembly of valve assembly 40. Interior cavity 65 extends into the internal volume of liquid system connector 59 and terminates at annular bearing seat 63. Other interior cavity shapes capable of receiving ball 77 may also be utilized and are within the scope of the invention.

By utilizing the above described end body configuration, the rotatable valve element or ball may be substantially housed within end body 50. Consequently, that interior volume of the end body which was in the prior art filled with raw materials and which was essentially wasted space is now advantageously being utilized. In addition, the central body which housed the ball valve and which was sandwiched between two end bodies in the prior art can now be eliminated, thereby shortening the effective length of the valve assembly to provide a useful, compact valve for situations where space is limited.

While this invention has been described as having a preferred design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A valve assembly for controlling a flow of liquid between first and second components of a liquid handling system, comprising:

a rotatable valve element;

a first end body connectable to the first liquid handling system component, said first end body including a liquid conveying bore;

a second end body including:

an attachment flange including an inward surface facing in a first direction toward said first end body;

a liquid system connector connectable to the second liquid handling system component;

an interior cavity located outwardly in a second direction from said attachment flange inward surface, said interior cavity structured and arranged to house at least a majority portion of said rotatable valve element; and a liquid conveying bore in communication with said interior cavity;

means, engagable with said attachment flange, for fastening said second end body to said first end body;

means, operably connected to said rotatable valve element, for rotating said valve element between a first position, whereat flow communication between said first end body liquid conveying bore and said second end body liquid conveying bore is closed, and a second position, whereat flow communication between said first end body liquid conveying bore and said second end body liquid conveying bore is open;

wherein said rotatable valve element within said interior cavity outwardly extends into an internal volume of said liquid system connector whereby a portion of said rotatable valve element resides within an internal volume of the second liquid handling system component when said liquid system connector is connected to the second liquid handling system component;

said first end body structured to be disconnectable from the first liquid handling system component without disconnecting said liquid system connector of said second end body from the second liquid handling system component and without disassembling the valve assembly; and said liquid system connector of said second end body structured to be disconnectable from the second liquid handling system component without disconnecting said first end body from the first liquid handling system component and without disassembling the valve assembly.

2. The valve assembly of claim 1 wherein said valve element projects into said second liquid handling system component internal volume a distance of about 20% of a length of said second liquid handling system component designed to receive said liquid system connector.

3. The valve assembly of claim 1 wherein said valve element projects into said second liquid handling system component internal volume a distance of greater than about 20% of a length of said second liquid handling system component designed to receive said liquid system connector.

4. The valve assembly of claim 1 wherein said valve element projects into said second liquid handling system component internal volume a distance of between about 10% and about 20% of a length of said second liquid handling system component designed to receive said liquid system connector.

5. The valve assembly of claim 1 wherein said rotatable valve element is generally ball shaped with a diametrical bore, and wherein said diametrical bore is aligned with said first end body liquid conveying bore and said second end body liquid conveying bore when said rotatable valve element is disposed in said second position.

6. The valve assembly of claim 5 wherein said rotatable valve element is spherical.

7. The valve assembly of claim 1 wherein said fastening means comprises a plurality of bolts passing through holes in said second end body attachment flange.

8. The valve assembly of claim 1 wherein said rotatable valve element comprises an axis of rotation, wherein said second end body includes a second bore aligned along said axis of rotation, wherein said means for rotating said valve element includes a handle, and wherein said handle operably connects with said rotatable valve element through said second bore.

9. The valve assembly of claim 8 wherein said second end body includes a body section intermediate said attachment flange and said liquid system connector, and wherein said second bore extends through said body section.

10. The valve assembly of claim 1 wherein said first end body includes an attachment flange, and wherein said first end body attachment flange abuts said second end body attachment flange when said valve assembly is assembled.

11. A valve assembly for controlling a flow of liquid between first and second components of a liquid handling system, comprising:

a first end body including:
an attachment flange;
a bore for conveying liquid; and
means for connecting to the first liquid handling system component; a second end body including:
an attachment flange having an inward surface facing in a first direction toward said first end body;
a liquid system connector connectable to the second liquid handling system component and projecting outwardly from said attachment flange;
a first bore within said liquid system connector for conveying liquid;
an interior cavity outwardly extending in a second direction from said attachment flange inward surface, wherein said interior cavity is in communication with said first bore; and
a second bore in communication with said interior cavity and located outwardly in said second direction from said attachment flange inward surface;
a plurality of fastener means for engaging said first and second end body attachment flanges and mechanically fastening together said first end body and said second end body;
a valve element housed within said second end body interior cavity, said valve element rotatable between a first position, whereat flow communication between said first end body liquid conveying bore and said second end body first bore is closed, and a second position, whereat flow communication between said first end body liquid conveying bore and said second end body first bore is open;
a handle;
means, extending through said second end body second bore, for connecting said handle and said rotatable valve element, whereby rotation of said handle effects rotation of said valve element;
wherein said rotatable valve element within said interior cavity outwardly extends into an internal volume of said liquid system connector whereby a portion of said rotatable valve element resides within an internal volume of the second liquid handling system component when said liquid system connector is connected to the second liquid handling system component;
said connecting means of said first end body structured to be disconnectable from the first liquid handling system component without disconnecting said liquid system connector of said second end body from the second liquid handling system component and without disassembling the valve assembly; and
said liquid system connector of said second end body structured to be disconnectable from the second liquid handling system component without disconnecting said connecting means of said first end body from the first liquid handling system component and without disassembling the valve assembly.

12. The valve assembly of claim 11 wherein said rotatable valve element is generally ball shaped with a diametrical bore, and wherein said diametrical bore is aligned with said first end body liquid conveying bore and said second end body first bore when said rotatable valve element is disposed in said second position.

13. The valve assembly of claim 12 wherein said rotatable valve element is spherical.

14. The valve assembly of claim 11 wherein said rotatable valve element comprises an axis of rotation, and wherein said second end body second bore is aligned along said axis of rotation.

15. The valve assembly of claim 11 wherein said liquid system connector comprises a male adapter.

* * * * *